US012649841B2

(12) United States Patent
Jin et al.

(10) Patent No.: US 12,649,841 B2
(45) Date of Patent: Jun. 9, 2026

(54) METHOD FOR PRODUCING AND CHEMICALLY RECYCLING A CROSSLINKED THIOL-BASED PHOTOPOLYMER

(71) Applicants: Kailong Jin, Phoenix, AZ (US); Saleh Alfarhan, Tempe, AZ (US)

(72) Inventors: Kailong Jin, Phoenix, AZ (US); Saleh Alfarhan, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 713 days.

(21) Appl. No.: 18/304,279

(22) Filed: Apr. 20, 2023

(65) Prior Publication Data

US 2023/0340224 A1 Oct. 26, 2023

Related U.S. Application Data

(60) Provisional application No. 63/333,111, filed on Apr. 20, 2022.

(51) Int. Cl.
*C08J 11/28* (2006.01)
*C08G 75/045* (2016.01)

(52) U.S. Cl.
CPC ............. *C08J 11/28* (2013.01); *C08G 75/045* (2013.01); *C08J 2381/02* (2013.01)

(58) Field of Classification Search
None
See application file for complete search history.

(56) References Cited

U.S. PATENT DOCUMENTS 6,946,284 B2 * 9/2005 Warner ..................... C12P 1/00
435/262.5
7,151,152 B2 * 12/2006 Takata ................... C08G 18/83
525/410
(Continued)

FOREIGN PATENT DOCUMENTS

WO WO-2017156066 A1 * 9/2017 ........... C07C 243/38
WO WO-2019213134 A1 * 11/2019 ................ C09J 4/00

OTHER PUBLICATIONS

Wang et al. Recyclable and repolymerizable thiol-X photopolymers. Material Horizons. 2018, vol. 5, pp. 1042-1046 (Year: 2018).*
(Continued)

*Primary Examiner* — Sanza L. McClendon
(74) *Attorney, Agent, or Firm* — FULLER IP LAW LLC; Rodney J. Fuller

(57) ABSTRACT

A method for producing and recycling a crosslinked photopolymer is disclosed. The method includes mixing reactive thiols, multifunctional alkenes, and a photoinitiator to create a homogeneous mixture that is crosslinked through exposure to light. The method also includes decrosslinking the crosslinked photopolymer through base-catalyzed thiol-disulfide exchange reactions by mixing the crosslinked photopolymer with a reactive thiol, a base catalyst, and a solvent to create a decrosslinked material including recycled thiol oligomers which are reactive. The method further includes removing the base catalyst and the solvent and recrosslinking the recycled thiol oligomers by mixing stoichiometric amounts of the recycled thiol oligomers and a reactive alkene such that a molar ratio between thiol end groups and ene end groups is maintained at 1:1. The method includes adding a photoinitiator and mixing to create a homogeneous mixture, and recrosslinking the homogeneous mixture through expo-
(Continued)

sure to light. The recrosslinked photopolymer includes dynamic disulfide bonds.

20 Claims, 10 Drawing Sheets

(56) References Cited

U.S. PATENT DOCUMENTS

| | | | | |
|---|---|---|---|---|
| 8,309,680 | B2 * | 11/2012 | McManus | A61K 47/60 |
| | | | | 528/421 |
| 8,895,667 | B2 * | 11/2014 | Ellsworth | C08J 11/10 |
| | | | | 525/196 |
| 9,441,084 | B2 * | 9/2016 | Heardon | C08L 81/02 |
| 9,745,403 | B2 * | 8/2017 | Kaneko | C08G 18/3825 |
| 10,266,479 | B2 * | 4/2019 | Vilaplana Artigas | B01J 35/33 |
| 11,332,565 | B2 * | 5/2022 | Li | C08K 5/07 |
| 11,339,268 | B2 * | 5/2022 | Manas-Zloczower | C08J 11/24 |
| 11,390,710 | B2 * | 7/2022 | Droske | C08G 63/6886 |
| 11,478,985 | B2 * | 10/2022 | Barnes | B33Y 70/10 |
| 11,535,713 | B2 * | 12/2022 | Bowman | C08G 75/26 |
| 12,187,851 | B2 * | 1/2025 | Bowman | C08G 75/26 |
| 12,587,318 | B2 * | 3/2026 | El Hamss | H04L 1/1854 |
| 2005/0266546 | A1 * | 12/2005 | Warner | C12N 13/00 |
| | | | | 435/262 |
| 2013/0137785 | A1 * | 5/2013 | Fisher | C08C 19/08 |
| | | | | 521/43 |

OTHER PUBLICATIONS

Ahn, B. K.; Sung, J.; Rahmani, N.; Wa ng, G.; Kim, N.; Lease, K.; Sun, X. S., "UV-Curable, High-Shear Pressure- Sensitive Adhesives Derived from Acrylated Epoxidized Soybean Oil" The Journal of Adhesion 89, 323 2013.

Anastasio, R .; Peerbooms, W.; Cardinaels, R.; van Breemen, L. C. A., "Characterization of Ultraviolet-Cured Methacrylate Networks: From Photopolymerization to Ultimate Mechanical Properties" Macromolecules 52, 9220 2019.

Bagheri, A.; Jin, J., "Photopolymerization in 3D Printing" ACS Applied Polymer Materials 1, 593 2019.

Banerji, A.; Jin, K.; Liu, K.; Mahanthappa, M. K.; Ellison, C. J., "Cross-Linked Nonwoven Fibers by Room-Temperature Cure Blowing and in Situ Photopolymerization" Macromolecules 52, 6662 2019.

Baroli, B., "Photopolymerization of biomaterials: issues and potentialities in drug delivery, tissue engineering, and cell encapsulation applications" Journal of Chemical Technology & Biotechnology 81, 491 2006.

Bertozzi, E. R., "Chemistry and Technology of Elastomeric Polysulfide Polymers" Rubber Chemistry and Technology 41, 114 1968.

Chakma, P.; Konkolewicz, D., "Dynamic Covalent Bonds in Polymeric Materials" Angewandte Chemie International Edition 58, 9682 2019.

Chambon, F .; Winter, H. H., "Stoping of Crosslinking Reaction in a PDMS Polymer at the Gel Point" Polymer Bulletin 13, 499 1985.

Cohen, G., "UV/EB Market Trends" RadTech Report 26, 44 2012.

Crivello, J. V.; Reichmanis, E., "Photopolymer Materials and Processes for Advanced Technologies" Chemistry of Materials 26, 533 2014.

Croutxe-Barghorn, C.; Soppera, O.; Lougnot, D. J., "Fabrication of microlenses by direct photo-induced crosslinking polymerization" Applied Surface Science 168, 89 2000.

Denissen, W.; Rivero, G.; Nicolay, R.; Leibler, L.; Winne, J. M.; Du Prez, F. E., "Vinylogous Urethane Vitrimers" Advanced Functional Materials 25, 2451 2015.

Dickens, S. H.; Stansbury, J. W.; Choi, K. M.; Floyd, C. J. E., "Photopolymerization Kinetics of Methacrylate Dental Resins" Macromolecules 36, 6043 2003.

Ehrhardt, D.; Van Durme, K.; Jansen, J. F. G. A.; Van Mele, B.; Van den Brande, N., "Self-healing UV-curable polymer network with reversible Diels-Alder bonds for applications in ambient conditions" Polymer 203, 122762 2020.

Fernandes, P. A.; Ramos, M. J., "Theoretical Insights into the Mechanism for Thiol/Disulfide Exchange" Chemistry 10, 257 2004.

Fouassier, J. P.; Allonas, X.; Burget, D., "Photopolymerization reactions under visible lights: principle, mechanisms and examples of applications" Progress in Organic Coatings 47, 16 2003.

Fu, Q.; Yan, Q.; Zhou, M.; Xie, W.; Fu, H., "Study on UV/sunlight curable self-healing topological polysulfide polymer network based on disulfide exchange" Polymers for Advanced Technologies 32, 2252 2021.

Gandini, A., "The furan/maleimide Diels-Alder reaction: A versatile click-unclick tool in macromolecular synthesis" Progress in Polymer Science 38, 1 2013.

Gao, W.; Bie, M.; Liu, F.; Chang, P.; Quan, Y., "Self-Healable and Reprocessable Polysulfide Sealants Prepared from Liquid Polysulfide Oligomer and Epoxy Resin" ACS applied materials & interfaces 9, 15798 2017.

Ghatge, N.; Vernekar, S.; Lonikar, S., "Polysulfide Sealants" Rubber Chemistry and Technology 54, 197 1981.

Huang, S.; Kong, X.; Xiong, Y.; Zhang, X.; Chen, H.; Jiang, W.; Niu, Y.; Xu, W.; Ren, C., "An overview of dynamic covalent bonds in polymer material and their applications" European Polymer Journal 141, 110094 2020.

Jin, K.; Kim, S.-s.; Xu, J.; Bates, F. S.; Ellison, C. J., "An overview of dynamic covalent bonds in polymer material and their applications" ACS Macro Letters 7, 1339 2018.

Jin, K.; Li, L.; Torkelson, J. M., "Recyclable Crosslinked Polymer Networks via One-Step Controlled Radical Polymerization" Advanced Materials 28, 6746 2016.

Jurbergs, D.; Bruder, F.-K.; Deuber, F.; Facke, T.; Hagen, R.; Honel, D.; Rolle, T.; Weiser, M.-S.; Volkov, A., "New recording materials for the holographic industry"; SPIE, 2009.

Leprince, J. G.; Palin, W. M.; Hadis, M. A.; Devaux, J.; Leloup, G., "Progress in dimethacrylate-based dental composite technology and curing efficiency" Dental Materials 29, 139 2013.

Li, S.; Zuo, C.; Zhang, Y.; Wang, J.; Gan, H.; Li, S.; Yu, L.; Zhou, B.; Xue, Z., "Covalently cross-linked polymer stabilized electrolytes with self-healing performance via boronic ester bonds" Polymer Chemistry 11, 5893 2020.

Li, X.; Yu, R.; He, Y.; Zhang, Y.; Yang, X.; Zhao, X.; Huang, W., "Self-Healing Polyurethane Elastomers Based on a Disulfide Bond by Digital Light Processing 3D Printing" ACS Macro Letters 8, 1511 2019.

Liu, T.; Zhao, B.; Zhang, J., "Recent development of repairable, malleable and recyclable thermosetting polymers through dynamic transesterification" Polymer 194, 122392 2020.

Liu, Z.; Xiao, D.; Liu, G.; Xiang, H.; Rong, M.; Zhang, M., "Self-healing and reprocessing of transparent UV-cured polysiloxane elastomer" Progress in Organic Coatings 159, 106450 2021.

Ma, J.; Yang, Y.; Valenzuela, C.; Zhang, X.; Wang, L.; Feng, W., "Mechanochromic, Shape-Programmable and Self- Healable Cholesteric Liquid Crystal Elastomers Enabled by Dynamic CovalentBoronic Ester Bonds" Angewandte Chemie International Edition 61, e202116219 2022.

Maassen, E. E. L., "Dynamic covalent chemistry for UV curable networks." 2019.

Maassen, E. E. L.; Anastasio, R.; van Breemen, L. C. A.; Sijbesma, R. P.; Heuts, J. P. A., "Thermally Reversible Diels-Alder Bond-Containing Acrylate Networks Showing Improved Lifetime" Macromolecular Chemistry and Physics 221, 2000208 2020.

Manapat, J. Z.; Chen, Q.; Ye, P.; Advincula, R. C., "3D Printing of Polymer Nanocomposites via Stereolithography" Macromolecular Materials and Engineering 302, 1600553 2017.

Nouryon, "Thioplast G4" Product Data Sheet, https://www.nouryon.com/globalassets/inriver/resources/pds-thioplast-g4-en.pdf.

Pepels, M.; Filot, I.; Klumperman, B.; Goossens, H., "Self-healing systems based on disulfide-thiol exchange reactions" Polymer Chemistry 4, 4955 2013.

Pinitglang, S.; Watts, A. B.; Patel, M.; Reid, J. D.; Noble, M. A.; Gul, S.; Bokth, A.; Naeem, A.; Patel, H.; Thomas, E. W.; Sreedharan, S. K.; Verma, C.; Brocklehurst, K., "A Classical Enzyme Active

(56) References Cited

OTHER PUBLICATIONS

Center Motif Lacks Catalytic Competence until Modulated Electrostatically" Biochemistry 36, 9968 1997.

Schaufelberger, F.; Timmer, B. J. J.; Ramstrom, O. "Resolving a Reactive Organometallic Intermediate from Dynamic Directing Group Systems by Selective C@H Activation" In Dynamic Covalent Chemistry, 2017.

Scheutz, G. M.; Lessard, J. J.; Sims, M. B.; Sumerlin, B. S., "Adaptable Crosslinks in Polymeric Materials: Resolving the Intersection of Thermoplastics and Thermosets" Journal of the American Chemical Society 141, 16181 2019.

Schuster, M.; Turecek, C.; Varga, F.; Lichtenegger, H.; Stampfl, J.; Liska, R., "3D-shaping of biodegradable photopolymers for hard tissue replacement" Applied Surface Science 254, 1131 2007.

Sparks, B. J.; Hoff, E. F. T.; Xiong, L.; Goetz, J. T.; Patton, D. L., "Superhydrophobic Hybrid Inorganic-Organic Thiol-ene Surfaces Fabricated via Spray-Deposition and Photopolymerization" ACS Applied Materials & Interfaces 5, 1811 2013.

Stansbury, J. W., "Curing Dental Resins and Composites by Photopolymerization" J Esthet Dent 12, 300 2000.

Szajewski, R. P.; Whitesides, G. M., "Rate Constants and Equilibrium Constants for Thiol-Disulfide Interchange Reactions Involving Oxidized Glutathione" Journal of the American Chemical Society 102, 2011 1980.

Thompson, L. F.; Willson, C. G.; Tagawa, S., "Polymers for microelectronics"; American Chemical Society, 1993.

Wall, F. T., "Statistical Thermodynamics of Rubber" The Journal of Chemical Physics 11, 527 1943.

Wang, C.; Goldman, T. M.; Worrell, B. T.; McBride, M. K.; Alim, M. D.; Bowman, C. N., "Recyclable and repolymerizable thiol-X photopolymers" Materials Horizons 5, 1042 2018.

Wang, J.; Pei, Y.; Shi, H.; Gao, B.; Luo, S., Opt. "High-density and high-quality holographic storage in a multilayer glass-like photopolymer" Mater. Express 12, 845 2022.

Wang, X.; Schmidt, F.; Hanaor, D.; Kamm, P. H.; Li, S.; Gurlo, A., "High-density and high-quality holographic storage in a multilayer glass-like photopolymer" Additive Manufacturing 27, 80 2019.

Wang, Z.; Yang, H.; Fairbanks, B. D.; Liang, H.; Ke, J.; Zhu, C., "High-density and high-quality holographic storage in a multilayer glass-like photopolymer" Progress in Organic Coatings 131, 131 2019.

Winther, J. R.; Thorpe, C., "High-density and high-quality holographic storage in a multilayer glass-like photopolymer" Biochimica et Biophysica Acta (BBA)—General Subjects 1840, 838 2014.

Wojtecki, R. J.; Meador, M. A.; Rowan, S. J., "High-density and high-quality holographic storage in a multilayer glass-like photopolymer" Nature Materials 10, 14 2011.

Worrell, B. T.; McBride, M. K.; Lyon, G. B.; Cox, L. M.; Wang, C.; Mavila, S.; Lim, C.-H.; Coley, H. M.; Musgrave, C. B.; Ding, Y.; Bowman, C. N., "Bistable and photoswitchable states of matter" Nature Communications 9, 2804 2018.

Xiang, H.; Yin, J.; Lin, G.; Liu, X.; Rong, M.; Zhang, M., "Photo-crosslinkable, self-healable and reprocessable rubbers" Chemical Engineering Journal 358, 878 2019.

Yu, C.; Schimelman, J.; Wang, P.; Miller, K. L.; Ma, X.; You, S.; Guan, J.; Sun, B.; Zhu, W.; Chen, S., "Photo-crosslinkable, self-healable and reprocessable rubbers" Chemical Reviews 120, 10695 2020.

Zhang, L.; Qiu, T.; Zhu, Z.; Guo, L.; Li, X., "Photo-crosslinkable, self-healable and reprocessable rubbers" Macromolecular Rapid Communications 39, 1800121 2018.

Zhao, D.; Liu, S.; Wu, Y.; Guan, T.; Sun, N.; Ren, B., "Photo-crosslinkable, self-healable and reprocessable rubbers" Progress in Organic Coatings 133, 289 2019.

Zheng, N.; Xu, Y.; Zhao, Q.; Xie, T., "Dynamic Covalent Polymer Networks: A Molecular Platform for Designing Functions beyond Chemical Recycling and Self-Healing" Chemical Reviews 121, 1716 2021.

Zhou, L.; Chen, M.; Zhao, X., "Rapid degradation of disulfide-based thermosets through thiol-disulfide exchange reaction" Polymer 120, 1 2017.

Zhu, X.; Niu, Q.; Xu, Y.; Wu, G.; Li, G.; Nie, J.; Ma, G., "From small molecules to polymer fibers: Photopolymerization with electrospinning on the fly" Journal of Photochemistry and Photobiology A: Chemistry 353, 101 2018.

* cited by examiner

METHOD FOR PRODUCING AND CHEMICALLY RECYCLING A CROSSLINKED THIOL-BASED PHOTOPOLYMER

RELATED APPLICATIONS

This application claims the benefit of U.S. provisional patent application 63/333,111, filed Apr. 20, 2022, titled "Chemically Recyclable Crosslinked Thiol-Based Polymers," the entirety of the disclosure of which is hereby incorporated by this reference.

TECHNICAL FIELD

Aspects of this document relate generally to recyclable crosslinked photopolymers.

BACKGROUND

Photopolymers are generated from a mixture comprised of photoreactive liquid monomers and/or oligomers that can solidify when irradiated with light. This class of materials has many advantages including fast reaction kinetics, solvent-free processes, and tunable material properties, making these materials attractive for a wide range of applications. For example, photopolymers have been employed within (and subsequently advanced) the fields of stereolithographic additive manufacturing (i.e., 3D printing), fibers, biomaterials, and dentistry, among others. It is estimated that the annual consumption of photopolymers exceeds 220,000 tons in North America alone.

Often, the photopolymers used in real-world applications are covalently crosslinked to ensure good chemical/solvent resistance and robust thermal and mechanical properties. A good example of this is a highly crosslinked poly(meth) acrylate network synthesized through photoinitiated free-radical chain growth reactions of difunctional or multifunctional (meth)acrylate monomers. However, the permanent network structures of these crosslinked photopolymers prohibit them from being remolded, reprocessed, or recycled. This has led to a linear economy where these crosslinked photopolymers are generally discarded after reaching the end of the product's lifetime.

Over the past decade, significant research efforts have been devoted to the development of covalent adaptable networks (CANs) containing reversible or dynamic linkages that can remain connected under normal service conditions. When exposed to specific external stimuli (e.g., heat, etc.), these reversible or dynamic linkages can cleave or undergo bond exchange, imparting these novel network materials with self-healing, reprocessing, and/or recycling capabilities. Various types of reversible/dynamic bonds have been exploited for such network formation, including exchangeable disulfide and ester linkages, as well as reversible Diels-Alder linkages.

Inspired by these advancements, research has begun to incorporate such dynamic bonds into crosslinked photopolymers to make them reprocessable or recyclable. For example, a step-growth crosslinked photopolymer containing dynamic thioester linkages was obtained by thiol-ene photopolymerization between stoichiometric amounts of tetrafunctional thiols and pre-synthesized thioester-containing diallyl ethers. The resulting photopolymer can be degraded into photoreactive thiol oligomers via thiol-thioester exchange (i.e., transthioesterification) with a desired amount of tetrafunctional thiols under basic conditions, which can then be repolymerized again via thiol-ene reactions in a similar manner.

However, despite some progress in this field, the conventional reprocessable/recyclable crosslinked photopolymers typically require multi-step pre-syntheses of the photoreactive building blocks that contain desired dynamic linkages/functionalities (e.g., diallyl ethers containing pre-installed dynamic thioester linkages). Existing methods for producing and chemically recycling crosslinked photopolymers will be difficult/costly to scale up to satisfy industrial applications.

SUMMARY

According to one aspect, a method for recycling a crosslinked photopolymer includes decrosslinking the crosslinked photopolymer through base-catalyzed thiol-disulfide exchange reactions by mixing the crosslinked photopolymer with a reactive thiol that is difunctional, a base catalyst, and a solvent to create a decrosslinked material having recycled thiol oligomers which are reactive. The method also includes removing the base catalyst and the solvent from the decrosslinked material. The method includes recrosslinking the recycled thiol oligomers by mixing stoichiometric amounts of the recycled thiol oligomers having thiol end groups and a reactive alkene that is trifunctional having ene end groups such that a molar ratio between thiol end groups and ene end groups is maintained at 1:1. the recrosslinking also includes adding a photoinitiator and mixing to create a homogeneous mixture, and crosslinking the homogeneous mixture through exposure to light. The crosslinked photopolymer comprises dynamic disulfide bonds.

Particular embodiments may comprise one or more of the following features. The reactive thiol may be Thioplast G4. The reactive thiol may be a polysulfide containing reactive thiol end groups and internal disulfide bonds. The reactive alkene may be 1,3,5-triallyl-1,3,5-triazine-2,4,6-trione. The base catalyst may be triethylamine. Removing the base catalyst and the solvent from the decrosslinked material may include recovering the base catalyst and the solvent with a rotary evaporator. The base catalyst and the solvent recovered by the rotary evaporator may be ready for reuse in subsequent decrosslinking. The reactive thiol used to decrosslink the crosslinked photopolymer may be multifunctional. The reactive thiol may be Thioplast G44.

According to another aspect of the disclosure, a method for recycling a crosslinked photopolymer includes decrosslinking the crosslinked photopolymer through base-catalyzed thiol-disulfide exchange reactions by mixing the crosslinked photopolymer with a reactive thiol, a base catalyst, and a solvent to create a decrosslinked material having recycled thiol oligomers which are reactive. The method also includes removing the base catalyst and the solvent from the decrosslinked material. The method includes recrosslinking the recycled thiol oligomers by mixing stoichiometric amounts of the recycled thiol oligomers having thiol end groups and one of a reactive alkene, a polydiene, a multifunctional alkyne, a norbornene, an acrylate, a methacrylate, an isocyanate, an epoxide, and a maleimide. The recrosslinking further includes adding a photoinitiator and mixing to create a homogeneous mixture, and crosslinking the homogeneous mixture through exposure to light. The crosslinked photopolymer comprises dynamic disulfide bonds.

Particular embodiments may comprise one or more of the following features. The reactive thiol may be Thioplast G4. The reactive thiol may be a polysulfide containing reactive thiol end groups and internal disulfide bonds. Stoichiometric amounts of the recycled thiol oligomers including thiol end groups may be mixed with a reactive alkene having ene end groups such that a molar ratio between thiol end groups and ene end groups may be maintained at 1:1. The reactive alkene may be 1,3,5-triallyl-1,3,5-triazine-2,4,6-trione. The base catalyst may be triethylamine. Removing the base catalyst and the solvent from the decrosslinked material may include recovering the base catalyst and the solvent with a rotary evaporator. The base catalyst and the solvent recovered by the rotary evaporator may be ready for reuse in subsequent decrosslinking. The reactive thiol used to decrosslink the crosslinked photopolymer may be difunctional. The reactive thiol used to decrosslink the crosslinked photopolymer may be multifunctional. The reactive thiol may be Thioplast G44.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIG. 5B is a thermogravimetric analysis (TGA) of the samples of FIG. 5a;

DETAILED DESCRIPTION

Figure 1:
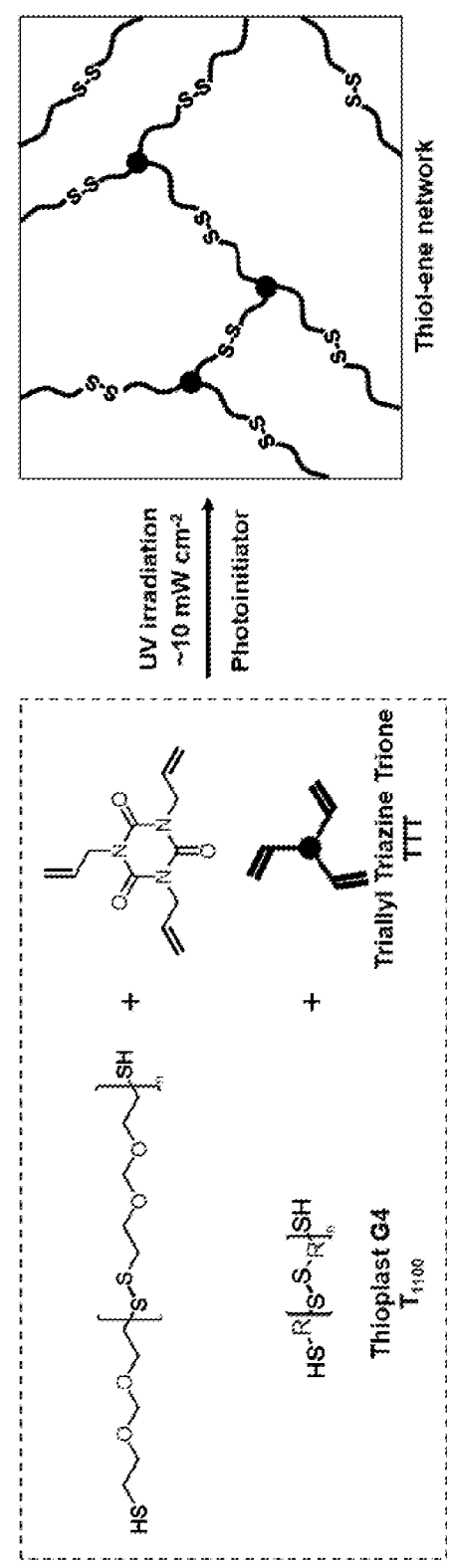
FIG. 1 is a schematic view of the synthesis or production of a chemically recyclable crosslinked photopolymer.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Photopolymers are generated from a mixture comprised of photoreactive liquid monomers and/or oligomers that can solidify when irradiated with light. This class of materials has many advantages including fast reaction kinetics, solvent-free processes, and tunable material properties, making these materials attractive for a wide range of applications. For example, photopolymers have been employed within (and subsequently advanced) the fields of stereolithographic additive manufacturing (i.e., 3D printing), fibers, biomaterials, and dentistry, among others. It is estimated that the annual consumption of photopolymers exceeds 220,000 tons in North America alone.

Often, the photopolymers used in real-world applications are covalently crosslinked to ensure good chemical/solvent resistance and robust thermal and mechanical properties. A good example of this is a highly crosslinked poly(meth) acrylate network synthesized through photoinitiated free-radical chain growth reactions of difunctional or multifunctional (meth)acrylate monomers. However, the permanent network structures of these crosslinked photopolymers prohibit them from being remolded, reprocessed, or recycled. This has led to a linear economy where these crosslinked photopolymers are generally discarded after reaching the end of the product's lifetime.

Over the past decade, significant research efforts have been devoted to the development of covalent adaptable networks (CANs) containing reversible or dynamic linkages that can remain connected under normal service conditions. When exposed to specific external stimuli (e.g., heat, etc.), these reversible or dynamic linkages can cleave or undergo bond exchange, imparting these novel network materials with self-healing, reprocessing, and/or recycling capabilities. Various types of reversible/dynamic bonds have been exploited for such network formation, including exchangeable disulfide and ester linkages, as well as reversible Diels-Alder linkages.

Inspired by these advancements, research has begun to incorporate such dynamic bonds into crosslinked photopolymers to make them reprocessable or recyclable. For example, a step-growth crosslinked photopolymer containing dynamic thioester linkages was obtained by thiol-ene photopolymerization between stoichiometric amounts of tetrafunctional thiols and pre-synthesized thioester-containing diallyl ethers. The resulting photopolymer can be degraded into photoreactive thiol oligomers via thiol-thioester exchange (i.e., transthioesterification) with a desired amount of tetrafunctional thiols under basic conditions, which can then be repolymerized again via thiol-ene reactions in a similar manner.

However, despite some progress in this field, the conventional reprocessable/recyclable crosslinked photopolymers typically require multi-step pre-syntheses of the photoreactive building blocks that contain desired dynamic linkages/functionalities (e.g., diallyl ethers containing pre-installed dynamic thioester linkages). Existing methods for producing and chemically recycling crosslinked photopolymers will be difficult/costly to scale up to satisfy industrial applications.

Contemplated herein are crosslinked thiol-based photopolymers that are chemically recyclable via thiol-disulfide exchange reactions, and methods for producing and recycling the same. The contemplated photopolymers comprise dynamic disulfide bonds within their network that allow for complete degradation of the polymer via thiol-disulfide exchange reactions upon the addition of excess free thiol groups and a base catalyst, according to various embodiments. Advantageous over conventional recyclable photopolymers, the contemplated polymer is made through a simple, one-step, and scalable synthesis using commercially available building blocks.

Specifically, liquid polysulfides containing both reactive thiol end groups and internal disulfide bonds, together with multifunctional alkenes, are selected as the building blocks to simultaneously incorporate disulfide bonds during network formation, via thiol-ene photopolymerization, according to various embodiments. The incorporated dynamic disulfide bonds allow these thiol-ene networks to be chemically recycled into photoreactive thiol oligomers through base-catalyzed thiol-disulfide exchange reactions. The contemplated photopolymers can be potentially recycled an infinite number of times without loss of material properties. The crosslinked photopolymer can be imbued with different material properties through modifying its building blocks while still maintaining chemical recyclability. This could all potentially provide a route towards a circular economy of crosslinked photopolymers.

Polysulfides are widely used polymers in the sealant industry, due to their resistance to sunlight, impermeability to various gases, and adhesive properties. Advantageously, the disulfide bonds embedded within the contemplated polysulfide backbone eliminate the need for the tedious pre-syntheses required by previous efforts to incorporate such dynamic linkages into crosslinked photopolymers. Thiol-disulfide exchange is a well-established reaction in the biochemistry field since its reaction rate is heavily dependent on pH. Thiols are relatively acidic (pKa=5-11) and can be readily deprotonated by a base catalyst into thiolate anions that can undergo a nucleophilic attack on one of the sulfur atoms in the disulfide bond, resulting in a new disulfide bond and a new thiolate anion, as will be discussed below.

According to various embodiments, the internal dynamic disulfide bonds allow the contemplated photopolymer to be fully degraded to an oligomer mixture via thiol-disulfide exchange promoted under basic conditions with excess thiol-group monomers/oligomers. The degraded oligomer mixture comprised of reactive thiol-end groups can be later recrosslinked with multifunctional alkenes under the same condition as the starting material and retain similar chemical compositions and material properties.

It should be noted that while most of the discussion below is done in the context of thiol-ene chemistry, the synthesis and recycling processes contemplated herein is not limited to the mentioned building blocks, according to various embodiments. Different thiol-X chemistries (e.g., thiol-isocyanate, thiol-epoxy, thiol-norbornene, thiol-acrylate, thiol-maleimide, thiol-yne, etc.) and hybrid networks may possess a wide range of recyclable material properties with the use of a thiol building block having internal dynamic disulfide bonds in its backbone, through the method contemplated herein. It should also be noted that although the contemplated recyclable chemistry disclosed herein is presented with a main focus on photopolymers, it can be readily implemented to a wide range of chemistries that possess multiple disulfide bonds within the crosslinked network.

FIG. 1 is a schematic view of a non-limiting example of the synthesis of a chemically recyclable crosslinked photopolymer. Specifically, it shows a difunctional reactive thiol monomer containing multiple disulfide bonds within its backbone combined with trifunctional reactive alkene building blocks to form a crosslinked photopolymer via thiol-ene reactions. According to various embodiments, the resulting thiol-ene networks containing dynamic disulfide bonds can be readily decrosslinked into photoreactive thiol oligomers via base-catalyzed thiol-disulfide exchange with a desired amount of the original difunctional thiols, which can be subsequently crosslinked again using a predetermined amount of the original trifunctional or multifunctional alkenes via thiol-ene photopolymerization reactions in a similar manner. Advantageously, such a recycling (i.e., decrosslinking-recrosslinking) process can be repeated multiple times, and all the repolymerized/recycled thiol-ene networks possess nearly identical chemical compositions and physical properties as those of the originally crosslinked photopolymers, according to various embodiments. The recycling of the contemplated crosslinked photopolymer will be discussed in greater detail with respect to FIG. 2, below.

FIG. 1 shows a specific, non-limiting example of the synthesis of the contemplated photopolymer. It should be noted that while the following discussion will be done in the context of specific embodiments making use of specific materials, in other embodiments, other materials may be employed to achieve the desirable recyclable properties afforded by the disulfide bonds and the use of base-catalyzed thiol-disulfide exchange reactions.

According to various embodiments, the reactive thiol is a polysulfide containing reactive thiol end groups and internal disulfide bonds. As shown in FIG. 1, in some embodiments, the reactive thiol may be Thioplast G4™ (hereinafter $T_{1100}$), a liquid polysulfide polymer commercially available from Nouryon. $T_{1100}$ has thiol end groups, as well as dynamic disulfide bonds within its backbone. The number average molecular weight (Mn) of $T_{1100}$ is roughly ~1100 g mol$^{-1}$. Furthermore, 1 mole of $T_{1100}$ molecules typically contains roughly 7 moles of disulfide bonds (hereinafter referred to as [S—S]) and roughly 2 moles of thiol end groups (hereinafter referred to as [SH]). As mentioned above, in other embodiments, a different reactive thiol containing internal disulfide bonds may be used, including a difunctional thiol such as Thioplast G44™ or a multifunctional thiol.

In some embodiments, including the non-limiting example shown in FIG. 1, the trifunctional or reactive alkene may be 1,3,5-triallyl-1,3,5-triazine-2,4,6-trione (hereinafter TTT). According to various embodiments, 1 mole of TTT molecules contain 3 moles of -ene end groups (hereinafter referred to as [ene]). As mentioned above, in other embodiments, other materials, including polydienes (including but not limited to polybutadiene, polyisoprene, ethylene propylene diene monomer rubber, and polystyrene-co-polyisoprene), multifunctional or reactive alkynes, norbornenes, acrylates, methacrylate, isocyanates, epoxides, maleimides, and their combinations, may be substituted for the reactive alkene and used to react with the abovementioned thiol monomers to form crosslinked polymers through various thiol-X chemistries.

The following discussion of the preparation of the contemplated photopolymer is done in the context of specific, non-limiting embodiments employing $T_{1100}$ as the reactive thiol and TTT as the reactive alkene. It should be understood that the specific examples used to discuss the contemplated methods and materials are non-limiting, and that other embodiments may employ variations on these materials. A discussion of the decrosslinking, and subsequent recrosslinking (e.g., recycling) of the contemplated photopolymer will be done in the context of FIG. 2 below.

According to various embodiments, the contemplated crosslinked photopolymer is prepared in the form of a crosslinked thiol-ene film via photopolymerization. First, TTT is melted at 40° C., then mixed with stoichiometric amounts of $T_{1100}$ (i.e., such that a molar ratio between thiol end groups and ene end groups is maintained at 1:1) and prescribed amounts of photoinitiators to form a homogeneous, transparent mixture.

As a specific example, in one embodiment, the photoreactive mixture contains ~5.5 g (i.e., ~5.0 mmol) of $T_{1100}$ (comprising ~10 mmol [SH] and ~35 mmol [S—S]), ~0.85 g (i.e., ~3.3 mmol) of TTT (i.e., 98% TTT from Sigma-Aldrich, comprising ~10 mmol [ene]), and ~0.19 g photoinitiator (~3 wt % relative to the total weight of reactive $T_{1100}$ and TTT building blocks). According to various embodiments, the photoinitiator may be tuned to ultraviolet wavelengths (e.g., Omnirad 2100 from IGM resins, etc.).

In this specific example, the resulting homogeneous mixture is cast between two clear glass slides separated with 0.5 mm thick spacers and subsequently exposed to UV light (i.e., Omnicure s1500 curing system with a 329-500 nm filter) for 5 minutes at 10 mW cm$^{-2}$ on each side, resulting in crosslinked thiol-ene films. Those skilled in the art will recognize that the photopolymer film may be created using different photoinitiators that may require different amounts and/or wavelengths and/or intensity of radiation, possibly for different amounts of time (e.g., as fast as within a few seconds), depending on the photoinitiator chosen.

Figure 2:
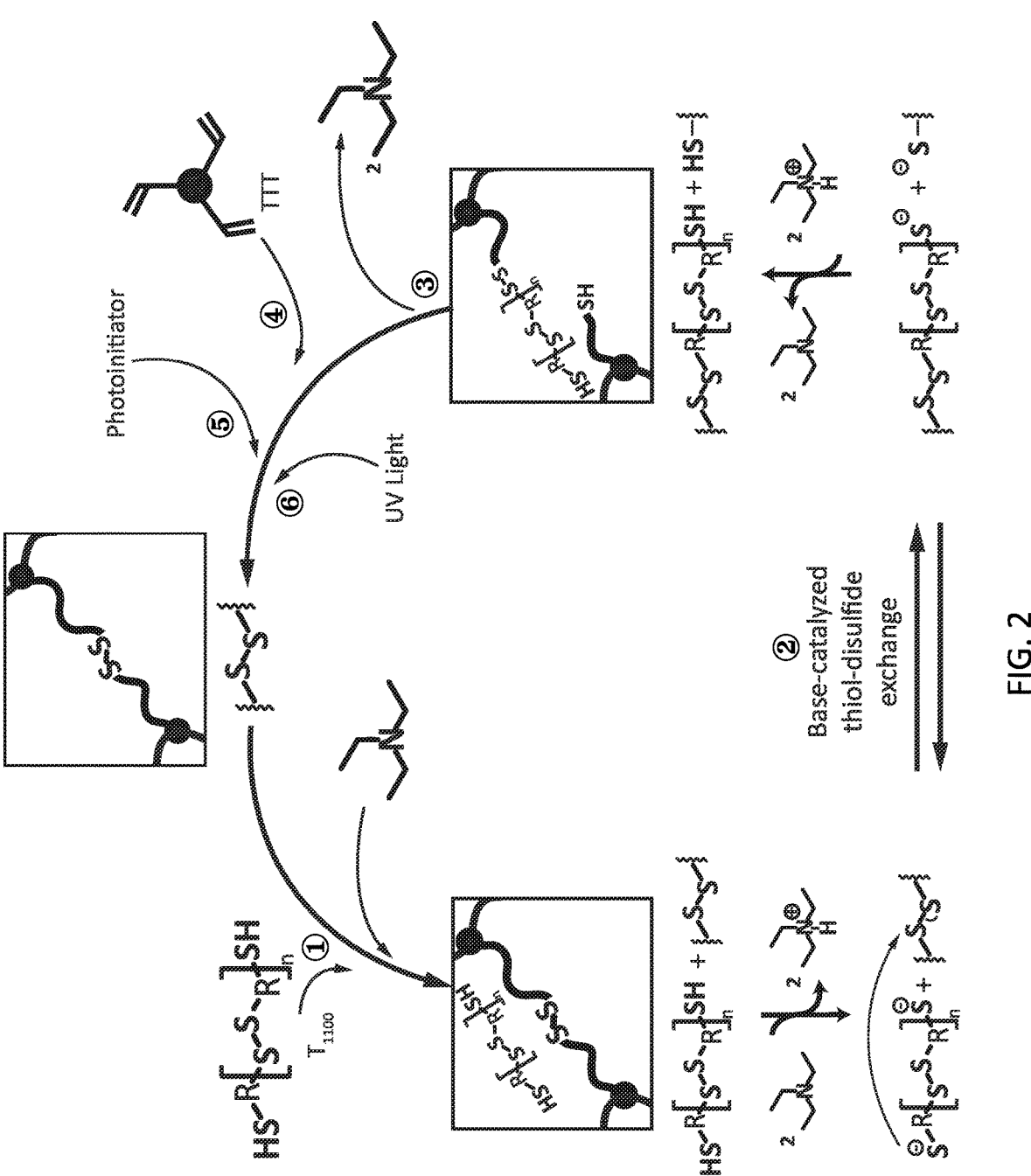
FIG. 2 is a schematic view of the chemical recycling of the contemplated crosslinked photopolymer.

FIG. 2 is a schematic view of a non-limiting example of the chemical recycling of the contemplated crosslinked thiol-ene photopolymer, according to various embodiments. Specifically, FIG. 2 shows the lifecycle of the contemplated photopolymer, which includes the decrosslinking of the thiol-ene network via base-catalyzed thiol-disulfide exchange reactions as well as the recrosslinking of the recovered thiol oligomers via thiol-ene photopolymerization reactions.

The following discussion of the decrosslinking and subsequent recrosslinking (e.g., recycling) of the contemplated photopolymer is done in the context of specific, non-limiting embodiments employing $T_{1100}$ and TTT. It should be understood that the specific examples used to discuss the contemplated methods and materials are non-limiting, and that other embodiments may employ variations on these materials.

According to various embodiments, the decrosslinking of the crosslinked photopolymer is started by mixing the crosslinked photopolymer with a reactive thiol, a base catalyst, and a solvent (not shown). See 'circle 1'. This begins is thiol-disulfide exchange reactions that are base-catalyzed, according to various embodiments, resulting in decrosslinked material. See 'circle 2'.

The reactive thiol used to recycle the crosslinked photopolymer may be whatever reactive thiol was used to create it, in some embodiments. In some embodiments, the base catalyst may be triethylamine (hereinafter TEA). In other embodiments, a different base catalyst may be used.

Continuing with the specific example from above, in one embodiment, roughly 1 g of the thiol-ene film (having ~5.8 mmol [S—S]) is shredded into small pieces and then mixed with ~6.4 g (i.e., approximately 5.8 mmol) of $T_{1100}$ (having ~11.6 mmol [SH] and ~41 mmol [S—S]), and also ~1.2 g (~11.6 mmol) of TEA, and ~9 mL of acetone (i.e., 99.5% acetone from Oakwood chemical). The resulting heterogeneous mixture is stirred overnight at room temperature to completely decrosslink the thiol-ene film via base-catalyzed thiol-disulfide exchange reactions. After reacting for roughly 14 hours, a homogeneous solution of the decrosslinked materials is obtained.

Those skilled in the art will recognize that the kinetics of the thiol-disulfide exchange reactions could be tuned by adjusting the reaction temperature and base catalyst concentration. In some embodiments, the time required to fully decrosslink the crosslinked thiol-ene photopolymer to form a homogeneous solution of the decrosslinked materials can be shortened to 10-30 minutes.

During the decrosslinking process via thiol-disulfide exchange reactions, the total amount of [SH] groups remains unchanged, according to various embodiments. In this specific example, there are ~11.6 mmol of [SH] groups.

The recovery of recycled thiol oligomers is completed by finally removing the base catalyst and the solvent from the decrosslinked material, yielding recycled thiol oligomers which are reactive. See 'circle 3'.

In some embodiments, the base catalyst and solvent may simply be removed from the homogeneous mixture. For example, in some embodiments, the homogeneous mixture may be dried in a fume hood overnight and then under dynamic vacuum (e.g., at 85° C. for 24 hours, etc.) to fully remove the solvent (e.g., volatile acetone, etc.) and base catalyst (e.g., TEA, etc.).

In other embodiments, the base catalyst and the solvent may be recovered from the decrosslinked material for reuse. In some embodiments, recovery may be accomplished using a rotary evaporator. In other embodiments, the recovery may be performed using any other method known in the art, that is compatible with the base catalyst and solvent being used. After recovery, this mixture of solvent and base catalyst is ready for reuse in subsequent decrosslinking, in some embodiments without any modification.

Continuing with the specific example, both volatile acetone (i.e., solvent) and TEA are effectively recovered from the decrosslinked mixture solution using a rotary evaporator, and the collected acetone/TEA mixture is then ready for use in a subsequent round of decrosslinking, without requiring further modification.

After being decrosslinked, the decrosslinked materials may be reused to create new films or other materials. The recycled thiol oligomers (comprising thiol end groups) are mixed with stoichiometric amounts of the reactive alkenes (comprising ene end groups), such that a molar ratio between thiol end groups and ene end groups is maintained at 1:1. See 'circle 4'.

A photoinitiator is also added, and mixed to create a homogeneous mixture. See 'circle 5'. In some embodiments, the same photoinitiator as was used previously may be used, while in other embodiments, a different photoinitiator may be used, allowing the photopolymer to be recycled for use in a different context in which a different light wavelength, intensity, duration, and/or source may be better suited. Finally, the homogeneous mixture is crosslinked through exposure to an appropriate light source. See 'circle 6'.

Continuing with the specific example from above, in one embodiment, the decrosslinked materials comprising roughly 11.6 mmol of [SH] groups are mixed with stoichiometric amounts of TTT monomers (i.e., ~11.6 mmol [ene] groups) and 3 wt % photoinitiator (relative to the total weight of the reactive thiol and TTT building blocks). The resulting homogeneous photoreactive mixture is cured under the same conditions previously used, forming crosslinked thiol-ene films again.

According to various embodiments, the contemplated polymer may be recycled repeatedly, broken down and reused to create a new material, while maintaining the desired properties. The following discussion is a comparison of various properties and measurements of a sample of the specific, non-limiting example discussed above, both after initial synthesis, and after a number of subsequent cycles of decrosslinking and recrosslinking.

As shown in FIG. 1, according to various embodiments, the contemplated photopolymer may be prepared by mixing stoichiometric amounts of commercially available difunctional thiols (i.e., $T_{1100}$), and trifunctional alkenes (i.e., TTT), where the molar ratio between [SH] and [ene] groups is maintained at 1:1. A trace amount of photoinitiators (e.g., ~3 wt % of the total weight of $T_{1100}$ and TTT) is then added to the mixture to form a homogeneous, photoreactive resin formulation, which undergoes photopolymerization upon UV light irradiation.

In a specific example, a batch of thiol-ene films were prepared by curing the same photoreactive resin formulation spaced between two clear glass slides with 0.5 mm spacers at a light intensity of 10 mW cm$^{-2}$ for 300 seconds on each side, for a total of 600 seconds of irradiation. Thereafter, various measurements were made.

Figure 3A:
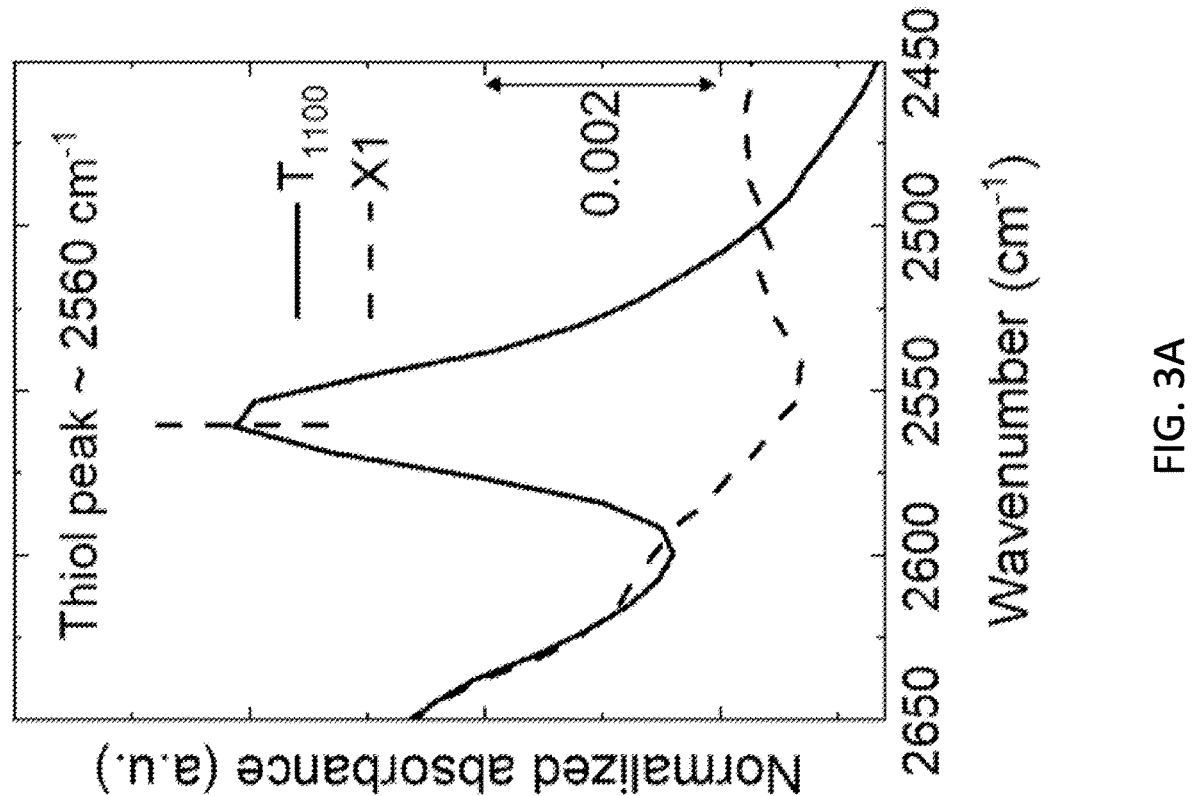
FIG. 3A is the ATR-FTIR (Fourier transform infrared spectroscopy) spectra of T1100 and an initial batch of thiol-ene film before any recycling has been performed.

FIG. 3A shows the ATR-FTIR (Fourier transform infrared spectroscopy) spectra of $T_{1100}$ and this initial batch of thiol-ene film before any recycling has been performed (hereinafter referred to as X1). After curing, nearly full consumption of [SH] was confirmed using ATR-FTIR by the disappearance of the characteristic thiol peak at ~2560 cm$^{-1}$ on the FTIR spectrum in FIG. 3A. This indicates that the photopolymerization is accomplished via thiol-ene reactions, according to various embodiments.

The crosslinking of these photopolymerized thiol-ene films may be confirmed by swelling test. In this particular example, the swelling test reported a gel fraction of 94.4±0.4%, as shown in Table 1. Therefore, these photopolymerized thiol-ene films possess crosslinked network structures and are noted as X1 (i.e., originally crosslinked) films. The material properties of these X1 films will be discussed in greater detail below.

TABLE 1

Properties of X1, X2, X3, and X4 crosslinked thiol-ene films

| Sample | X1 | X2 | X3 | X4 |
|---|---|---|---|---|
| Gel fraction (%) | 94.4 ± 0.4 | 94.2 ± 0.3 | 94.0 ± 0.7 | 94.8 ± 0.2 |
| $T_g$ (° C.) | −43.3 ± 0.5 | −43.0 ± 0.8 | −42.8 ± 0.4 | −42.7 ± 0.2 |
| $T_{d\ at\ 5\ wt\ \%\ loss}$ (° C.) | 263.4 ± 0.1 | 263.7 ± 0.1 | 265.9 ± 1.1 | 264.3 ± 4.7 |
| Storage modulus [MPa] | 0.61 ± 0.10 | 0.67 ± 0.10 | 0.67 ± 0.02 | 0.73 ± 0.10 |
| Young's modulus [MPa] | 5.0 ± 0.1 | 5.5 ± 0.3 | 5.4 ± 0.2 | 5.1 ± 0.1 |
| Elongation at break [%] | 12.4 ± 1.6 | 12.1 ± 2.2 | 14.0 ± 1.8 | 14.3 ± 1.5 |
| Tensile strength [MPa] | 0.54 ± 0.10 | 0.58 ± 0.10 | 0.64 ± 0.10 | 0.61 ± 0.10 |

As shown in FIG. 1, the crosslinked X1 films inherently contain dynamic [S—S] bonds within their network structures, which can remain covalently bonded under neutral and acidic conditions but undergo exchange reactions with reactive thiols under basic conditions, according to various embodiments. To completely decrosslink the X1 films containing dynamic [S—S] bonds, desired amounts of $T_{1100}$ (i.e., moles of $T_{1100}$:moles of [SH]:moles of [S—S]=1:2:1), acetone, and TEA base catalysts (i.e., moles of TEA:moles of [SH]=1:1) were added to induce the thiol-disulfide exchange reactions under ambient conditions, as shown in FIG. 2.

Continuing with the specific example from above, after leaving the initially heterogeneous mixture overnight at room temperature, the crosslinked X1 films were completely dissolved, resulting in a homogeneous solution of the decrosslinked materials. When the TEA base catalysts were absent, however, the X1 films remained crosslinked and only underwent swelling, highlighting the importance of the base catalysts for thiol-disulfide exchange reactions. The decrosslinked materials were recovered by removing volatile solvent and TEA through vacuum drying, and the resulting sample is hereinafter noted as DX1.

Figure 3B:
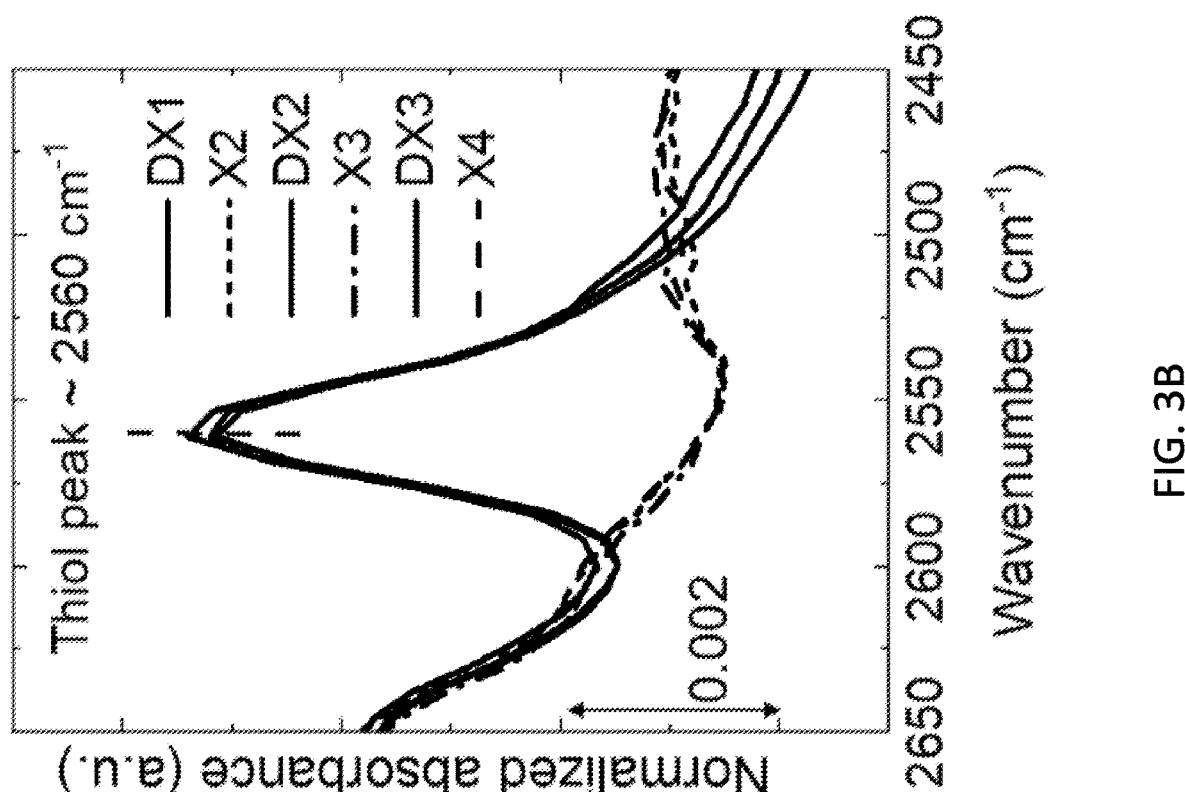
FIG. 3B is the ATR-FTIR spectra of decrosslinked and recrosslinked materials with increasing number of recycles.

FIG. 3B shows the ATR-FTIR spectra of decrosslinked (i.e., DX1-3) and recrosslinked (i.e., X2-4) materials with increasing number of recycles. As shown in FIG. 3B, the characteristic thiol peak at ~2560 $cm^{-1}$ reappeared on the FTIR spectrum of DX1, indicative of the presence of reactive [SH] end groups in the decrosslinked sample.

Figure 4A:
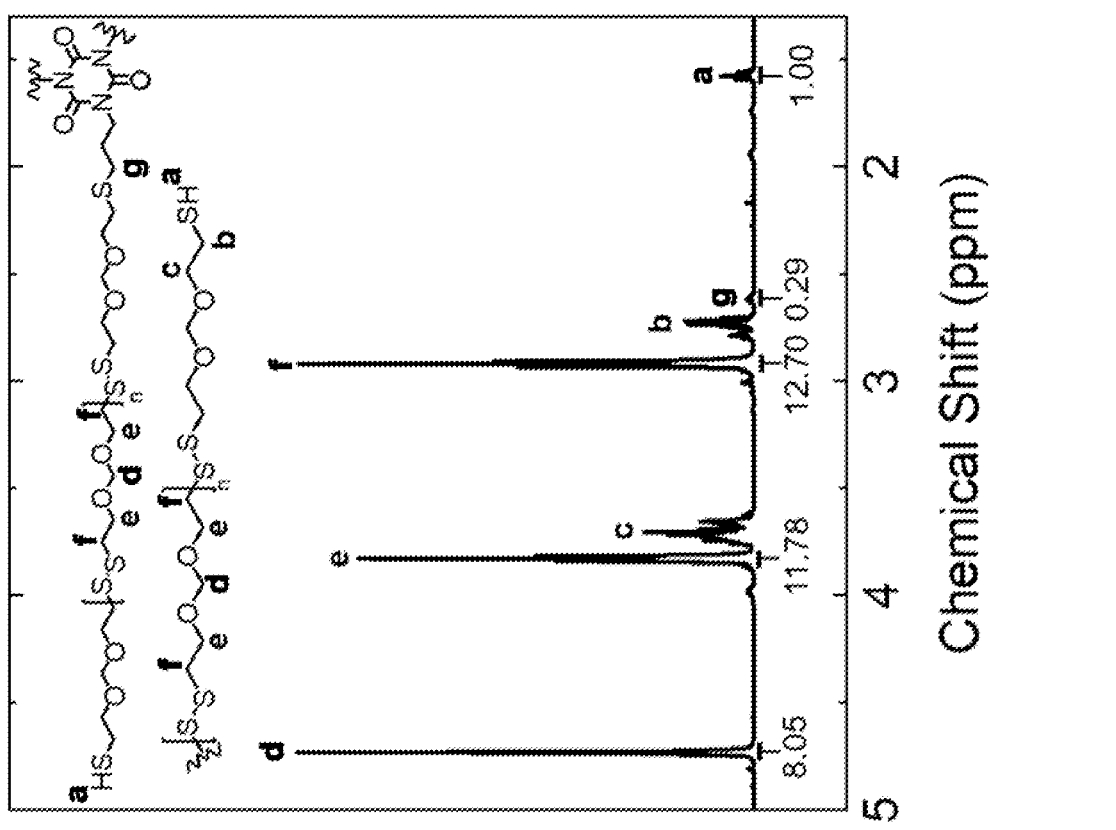
FIG. 4A is the $^1$H NMR spectrum of decrosslinked photopolymer.
Figure 4B:
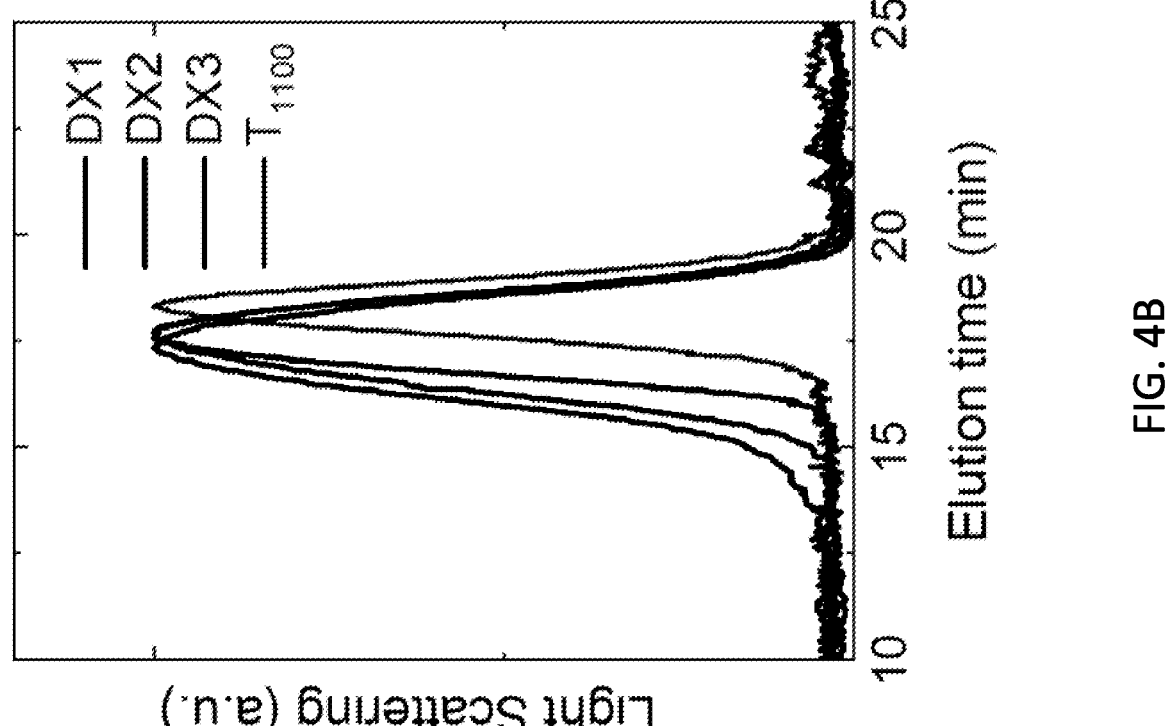
FIG. 4B is the size exclusion chromatography (SEC) traces for T1100, and samples of decrosslinked photopolymer.

Continuing with the examination of the recycling of this specific example, FIG. 4A shows the $^1$H NMR spectrum of DX1, and FIG. 4B shows the size exclusion chromatography (SEC) traces for $T_{1100}$, DX1, DX2, and DX3. Consistently, the $^1$H NMR spectrum of DX1 in FIG. 4A shows signals of the terminal thiol protons (peak a at 1.57 ppm; 1 mole of a protons correspond to 1 mole of [SH] end groups) as well as the protons closest to the thiol-ene linkage (peak g at 2.62 ppm; 6 moles of g protons correspond to 1 mole of TTT molecules). The intensity ratio between peaks a and g in FIG. 4*a* is ~1:0.3. This is reasonable considering the fact that to decrosslink a thiol-ene network containing 1 mole of dynamic [S—S] linkages (i.e., a network formed by reacting ~0.15 moles of $T_{1100}$ with ~0.1 moles of TTT; ~0.1 moles of TTT molecules correspond to ~0.6 moles of g protons), 1 mole of $T_{1100}$ molecules were added (i.e., ~7 moles of [S—S] bonds and ~2 moles of [SH] end groups; ~2 moles of [SH] groups correspond to 2 moles of a protons). Therefore, a simple calculation indicates that the intensity ratio between peaks a and g in the decrosslinked materials should be ~2:0.6 (i.e., ~1:0.3), given that the decrosslinking is achieved by thiol-disulfide exchange, during which the amounts of [S—S] and [SH] would remain unchanged (FIG. 2).

Furthermore, the $^1$H NMR spectrum of DX1 in FIG. 4A shows signals of the methylene protons adjacent to the [S—S] bonds (peak f at 2.92 ppm), confirming the presence of the [S—S] linkages in the decrosslinked materials. The molar ratio between the [S—S] bonds and the [SH] end groups is estimated to be ~4:1 based on the intensity ratio between peaks d at 4.71 ppm and a at 1.57 ppm (~8:1; FIG. 4*a*), since 8 moles of d protons correspond to 4 mole of [S—S] bonds while 1 mole of a protons correspond to 1 mole of [SH] groups. This experimentally determined [S—S]:[SH] molar ratio is consistent with the theoretical calculation based on the decrosslinking mixture composition as discussed above (i.e., ~8 moles of [S—S] bonds and ~2 moles of [SH] groups). Overall, these NMR results demonstrate that the X1 films can undergo effective base-catalyzed thiol-disulfide exchange reactions with $T_{1100}$ to result in reactive thiol oligomers.

The loss of network structure after decrosslinking was also confirmed by SEC analyses in FIG. 4B. According to FIG. 4B, the SEC peak of DX1 is shifted to a slightly shorter elution time compared to that of $T_{1100}$, indicative of the higher molecular weight of the decrosslinked thiol oligomers. Specifically, the Mn of DX1 is determined to be ~3,000 g $mol^{-1}$ by SEC, slightly higher than that of $T_{1100}$ (determined to be ~2,000 g $mol^{-1}$ by SEC). The higher Mn value of DX1 as compared to that of $T_{1100}$ is reasonable due to the presence of permanent thiol-ene linkages in X1, which would remain intact after decrosslinking. As shown in both FIG. 2 and FIG. 4A, complete decrosslinking of X1 would result in a mixture of reactive thiol oligomers.

According to various embodiments, according to the thiol-disulfide exchange mechanism in FIG. 2, the total amount of [SH] groups would remain constant after decrosslinking, and thus the number of [SH] groups in the decrosslinked thiol oligomers can be easily calculated based on the moles of $T_{1100}$ added to initiate the decrosslinking process. After determining the [SH] content in DX1, a stoichiometric amount of TTT monomers were mixed with DX1, followed by the addition of 3 wt % photoinitiator (relative to the total weight of DX1 and TTT) to form a homogeneous photoreactive mixture. This mixture was cured again under the same conditions, and the resulting thiol-ene films are hereinafter noted as X2 films. Similarly, after curing, nearly full consumption of [SH] was confirmed using ATR-FTIR by the disappearance of the characteristic thiol peak at ~2560 $cm^{-1}$ on the FTIR spectrum of X2 in FIG. 3B. The crosslinking of X2 was confirmed by swelling test, which reported a gel fraction of 94.2±0.3% (Table 1), within error the same as that of X1.

Such decrosslinking (via thiol-disulfide exchange) and recrosslinking (via thiol-ene photopolymerization) processes can be effectively repeated to result in decrosslinked reactive thiol oligomers (e.g., DX2 and DX3) and recrosslinked thiol-ene films (e.g., X3 and X4). It should be noted that both DX2 and DX3 show almost the same chemical compositions and molecular weights as those of DX1. Similarly, both X3 and X4 show full consumption of [SH] after photopolymerization and nearly identical gel fractions as those of X1 and X2, indicative of the robust network structures in these recycled crosslinked thiol-ene films. It should also be noted that a stoichiometric balance between [SH] (introduced only by $T_{1100}$) and [ene] (introduced only by TTT) groups always holds in these crosslinked thiol-ene films (i.e., X1, X2, X3, and X4). According to various embodiments, the chemical composition, i.e., the molar ratio between $T_{1100}$ and TTT, remains the same in the X1, X2, X3, and X4 crosslinked thiol-ene films. Consequently, it is reasonable to expect all these crosslinked thiol-ene films would exhibit nearly identical material properties.

According to various embodiments, the unique chemical recyclability of the contemplated crosslinked thiol-ene photopolymers can be attributed to the presence of dynamic [S—S] bonds within their network structures. This has been demonstrated in a specific embodiment through a careful control experiment. Specifically, the X1 films containing dynamic [S—S] bonds were also decrosslinked in a different manner by cleaving [S—S] bonds into [SH] groups with the addition of tributylphosphine (TBP) and water. The phosphine derivatives such as TBP can undergo a nucleophilic attack to cleave the [S—S] bonds into thiolate anions, which can then be hydrolyzed to produce [SH] end groups. Similarly, a homogeneous solution of decrosslinked materials was obtained after decrosslinking X1 using TBP/water, and the decrosslinked sample was then recovered by vacuum drying (hereinafter noted as DX-TBP). Different from DX1, the 1H NMR spectrum of DX-TBP showed no evidence of the methylene protons adjacent to the [S—S] bonds (i.e., peak f at ~2.92 ppm in FIG. 4A), confirming the disappearance of [S—S] bonds after decrosslinking. In addition, there is evidence of the appearance of [SH] end groups in the DX-TBP sample. These NMR results demonstrate the successful conversion of [S—S] bonds into [SH] end groups in presence of TBP/water.

After decrosslinking, the total amount of the [SH] end groups in DX-TBP can be easily calculated from the moles of [S—S] bonds in X1, i.e., moles of [SH] groups in DX-TBP=2×moles of [S—S] bonds in X1. Similarly, the decrosslinked reactive thiols were recrosslinked using a stoichiometric amount of TTT via thiol-ene photopolymerization under the same conditions. The resulting crosslinked films report full consumption of [SH] after photopolymerization and high gel content, confirming the robust network structures in these recrosslinked thiol-ene films (hereinafter noted as X2-TBP). Distinctively different from the X2 films discussed above, these X2-TBP films no longer contain dynamic [S—S] bonds within their network structures. As a result, X2-TBP only exhibited swelling behavior in presence of $T_{1100}$ and TEA, indicative of a permanent network structure that cannot be decrosslinked due to the absence of dynamic [S—S] bonds. Overall, this proves the essential role of [S—S] bonds in enabling repeated and effective chemical recycling of the contemplated crosslinked thiol-ene photopolymers via thiol-disulfide exchange reactions.

Figure 5A:
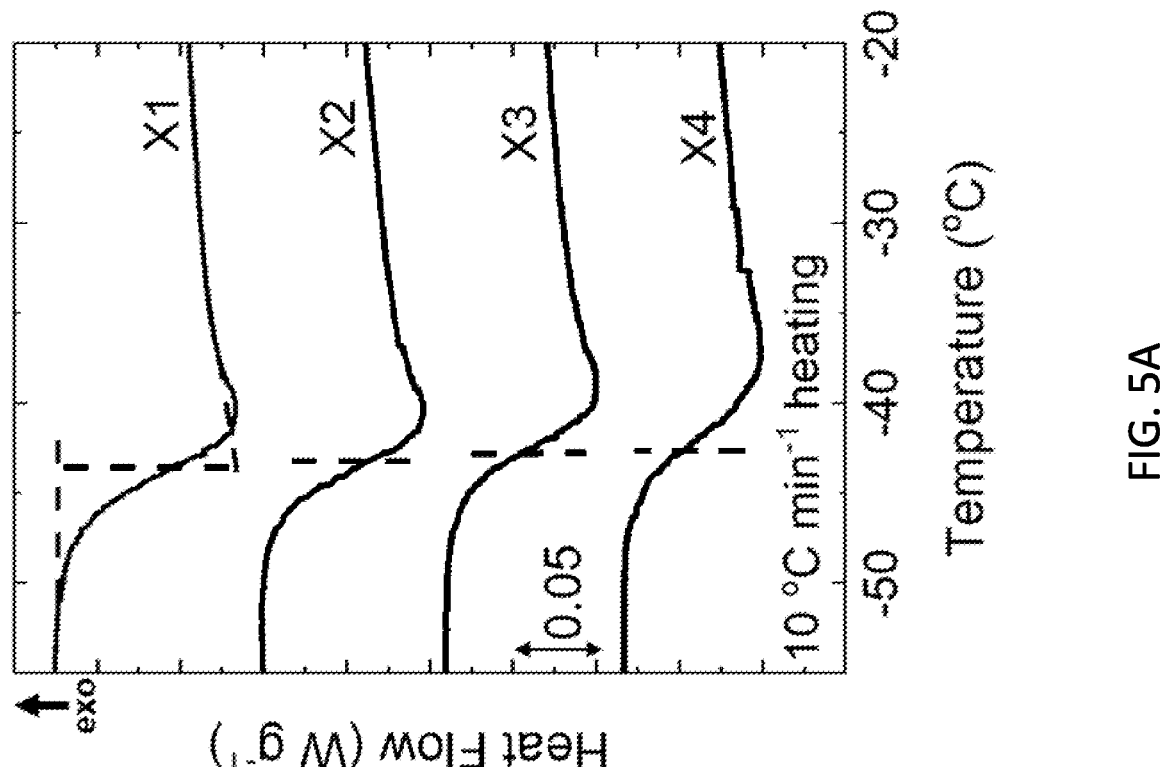
FIG. 5A is the differential scanning calorimetry (DSC) thermograms of samples of crosslinked thiol-ene photopolymers.

Advantageously, various material properties present in the contemplated polymer after the initial synthesis continue to be present throughout the subsequent recycling processes. FIG. 5A shows the differential scanning calorimetry (DSC) thermograms of X1, X2, X3, and X4 crosslinked thiol-ene photopolymers, based on which the glass transition temperature ($T_g$) values can be characterized. As shown in both FIG. 5A and Table 1, the $T_g$ values of X1, X2, X3, and X4 are within error the same, all of which are around −43° C. The sub-ambient $T_g$ values of these crosslinked thiol-ene films are consistent with their appearances as soft rubbery materials at room temperature.

Figure 5B:
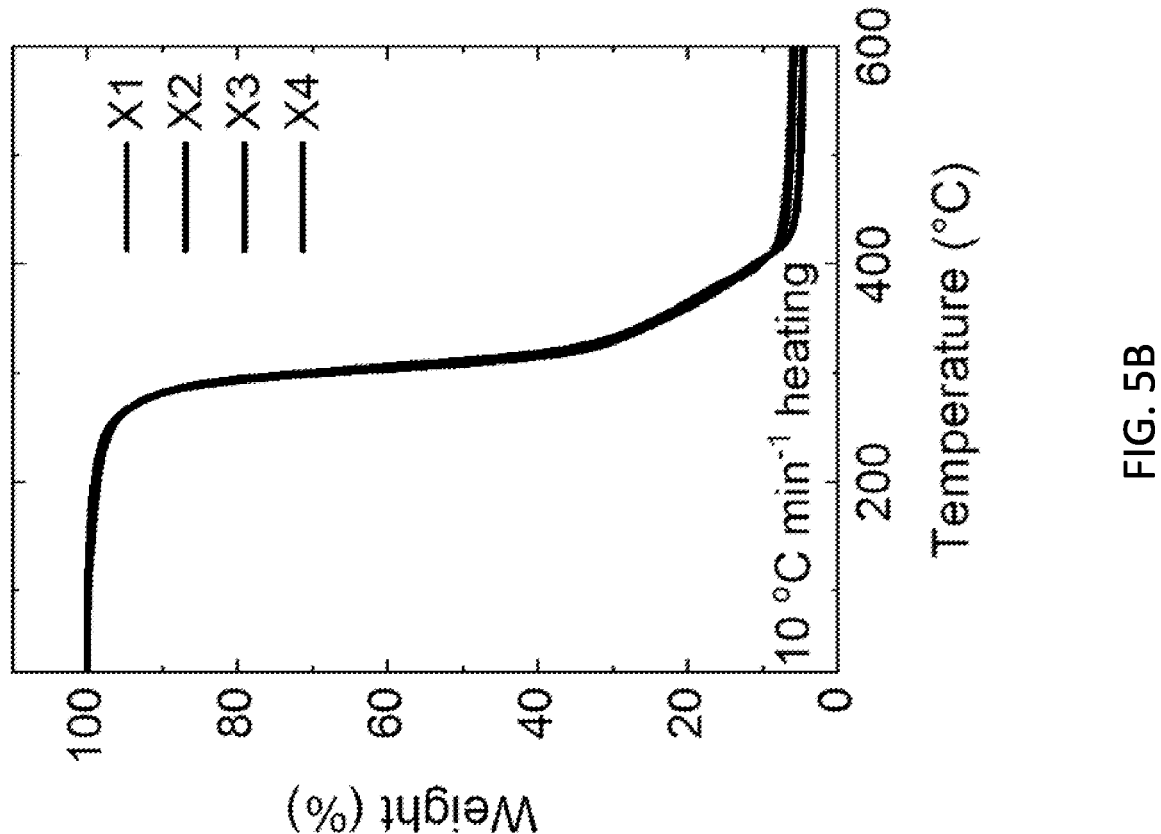

FIG. 5B shows a thermogravimetric analysis (TGA) of X1, X2, X3, and X4 crosslinked thiol-ene films. Table 1 also compiles the TGA analyses of X1, X2, X3, and X4 crosslinked thiol-ene photopolymers. Upon comparison, all report nearly identical $T_{d\ @\ 5\%}$ weight loss values at ~264° C. These results indicate that these chemically recycled thiol-ene networks exhibit almost the same thermal transitions and stabilities as those of the originally crosslinked photopolymers.

Figure 6A:
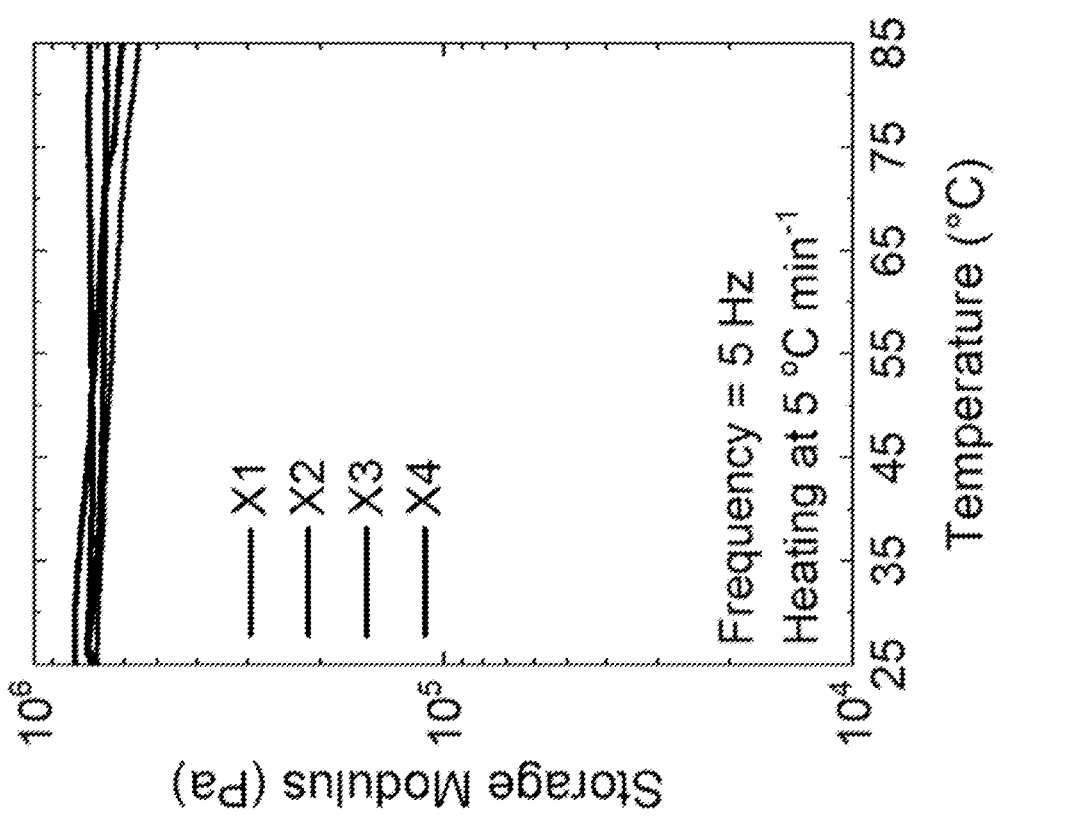
FIG. 6A is the temperature-dependent storage moduli (G') for samples of crosslinked thiol-ene photopolymers.

FIG. 6A shows the temperature-dependent storage moduli (G') for X1, X2, X3, and X4 crosslinked thiol-ene photopolymers, all of which show rubbery plateaus above room temperature. These results are consistent with the crosslinked network structures in these thiol-ene photopolymers, according to the ideal rubber elasticity theory. In addition, the G' values of all these crosslinked thiol-ene films at 70° C. are within error the same as each other (Table 1), indicative of nearly identical crosslink density in each sample.

Figure 6B:
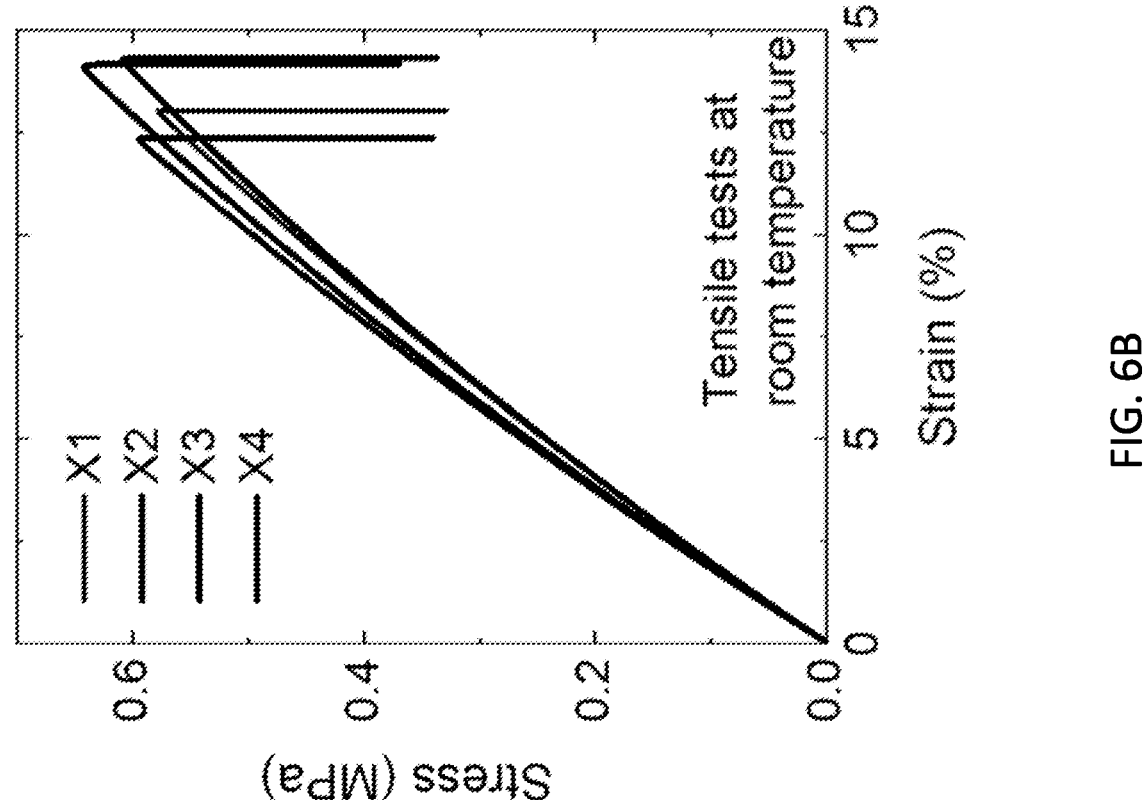
FIG. 6B is the representative stress-strain curves obtained from tensile tests under ambient conditions for the photopolymer film samples.

FIG. 6B shows the representative stress-strain curves obtained from tensile tests under ambient conditions for X1, X2, X3, and X4 crosslinked thiol-ene films, and the corresponding tensile properties are compiled in Table 1. According to both FIG. 6B and Table 1, X1, X2, X3, and X4 crosslinked thiol-ene films exhibit nearly identical tensile properties at room temperature, with Young's modulus, elongation at break, and tensile strength being ~5 MPa, ~13%, and ~0.6 MPa, respectively. These results demonstrate that these chemically recycled thiol-ene networks exhibit almost the same thermomechanical properties as those of the originally crosslinked photopolymers, according to various embodiments.

Overall, the characterization results compiled in FIGS. 5 and 6 as well as Table 1 collectively demonstrate that the originally crosslinked and chemically recycled thiol-ene network films exhibit nearly identical material properties, regardless of the number of recycles. This observation is reasonable considering the fact that the chemical composition (i.e., the molar ratio between $T_{1100}$ and TTT) is identical among all these crosslinked thiol-ene films. Therefore, the crosslinked thiol-ene photopolymers developed in this study can be chemically recycled into photoreactive building blocks via thiol-disulfide exchange, which can be effectively recrosslinked through thiol-ene photopolymerization, according to various embodiments. Such a robust chemical recycling process can be repeated many (theoretically infinite) times with full property retention.

Towards promoting chemical circularity, the volatile solvent (i.e., acetone) and base catalyst (i.e., TEA) used to promote the decrosslinking of thiol-ene network as discussed above are fully recovered through a simple rotary evaporation process, according to various embodiments. The recovered solvent/catalyst mixture was repeatedly used for the next round of decrosslinking experiment, with minimal to no loss of the decrosslinking performance. The effective recovery of volatile solvents and catalysts, together with the robust chemical recycling of photoreactive building blocks, could provide a potential route towards a circular economy of crosslinked photopolymers.

It will be understood that implementations are not limited to the specific components disclosed herein, as virtually any components consistent with the intended operation of a method and/or system implementation for a chemically-recyclable crosslinked photopolymer may be utilized. Accordingly, for example, although particular materials may be disclosed, such components may comprise any shape, size, style, type, model, version, class, grade, measurement, concentration, material, weight, quantity, and/or the like consistent with the intended operation of a method and/or system implementation for chemically-recyclable crosslinked photopolymer may be used. For example, in some embodiments, Thioplast G4 could be replaced with other polysulfides containing reactive thiol end groups such as Thioplast G44. In addition, in some embodiments, multifunctional alkenes could be substituted with polydienes, multifunctional alkynes, norbornenes, acrylates, methacrylate, isocyanates, epoxides, and maleimides. In places where the description above refers to particular implementations of chemically-recyclable crosslinked photopolymer, it should be readily apparent that a number of modifications may be made without departing from the spirit thereof and that these implementations may be applied to other chemically-recyclable crosslinked polymers.

What is claimed is:

1. A method for recycling a crosslinked photopolymer, comprising:

decrosslinking the crosslinked photopolymer through base-catalyzed thiol-disulfide exchange reactions by mixing the crosslinked photopolymer with a reactive thiol that is difunctional, a base catalyst, and a solvent to create a decrosslinked material comprising recycled thiol oligomers which are reactive;

removing the base catalyst and the solvent from the decrosslinked material; and recrosslinking the recycled thiol oligomers by:

mixing stoichiometric amounts of the recycled thiol oligomers comprising thiol end groups and a reactive alkene that is trifunctional comprising ene end groups such that a molar ratio between thiol end groups and ene end groups is maintained at 1:1;

adding a photoinitiator and mixing to create a homogeneous mixture; and crosslinking the homogeneous mixture through exposure to light;

wherein the crosslinked photopolymer comprises dynamic disulfide bonds.

2. The method of claim 1, wherein the reactive thiol is Thioplast G4™.

3. The method of claim 1, wherein the reactive thiol is a polysulfide containing reactive thiol end groups and internal disulfide bonds.

4. The method of claim 1, wherein the reactive alkene is 1,3,5-triallyl-1,3,5-triazine-2,4,6-trione.

5. The method of claim 1, wherein the base catalyst is triethylamine.

6. The method of claim 1, wherein removing the base catalyst and the solvent from the decrosslinked material comprises recovering the base catalyst and the solvent with a rotary evaporator.

7. The method of claim 6, wherein the base catalyst and the solvent recovered by the rotary evaporator is ready for reuse in subsequent decrosslinking.

8. The method of claim 1, wherein the reactive thiol used to decrosslink the crosslinked photopolymer is multifunctional.

9. The method of claim 1, wherein the reactive thiol is Thioplast G44.

10. A method for recycling a crosslinked photopolymer, comprising:

decrosslinking the crosslinked photopolymer through base-catalyzed thiol-disulfide exchange reactions by mixing the crosslinked photopolymer with a reactive thiol, a base catalyst, and a solvent to create a decrosslinked material comprising recycled thiol oligomers which are reactive;

removing the base catalyst and the solvent from the decrosslinked material; and recrosslinking the recycled thiol oligomers by:

mixing stoichiometric amounts of the recycled thiol oligomers comprising thiol end groups and one of a reactive alkene, a polydiene, a multifunctional alkyne, a norbornene, an acrylate, a methacrylate, a isocyanate, an epoxide, and a maleimide;

adding a photoinitiator and mixing to create a homogeneous mixture; and crosslinking the homogeneous mixture through exposure to light;

wherein the crosslinked photopolymer comprises dynamic disulfide bonds.

11. The method of claim 10, wherein the reactive thiol is Thioplast G4™.

12. The method of claim 10, wherein the reactive thiol is a polysulfide containing reactive thiol end groups and internal disulfide bonds.

13. The method of claim 10, wherein stoichiometric amounts of the recycled thiol oligomers comprising thiol end groups are mixed with a reactive alkene comprising ene end groups such that a molar ratio between thiol end groups and ene end groups is maintained at 1:1.

14. The method of claim 13, wherein the reactive alkene is 1,3,5-triallyl-1,3,5-triazine-2,4,6-trione.

15. The method of claim 10, wherein the base catalyst is triethylamine.

16. The method of claim 10, wherein removing the base catalyst and the solvent from the decrosslinked material comprises recovering the base catalyst and the solvent with a rotary evaporator.

17. The method of claim 16, wherein the base catalyst and the solvent recovered by the rotary evaporator is ready for reuse in subsequent decrosslinking.

18. The method of claim 10, wherein the reactive thiol used to decrosslink the crosslinked photopolymer is difunctional.

19. The method of claim 10, wherein the reactive thiol used to decrosslink the crosslinked photopolymer is multifunctional.

20. The method of claim 10, wherein the reactive thiol is Thioplast G44™.

* * * * *